United States Patent
Robertson, Jr. et al.

(10) Patent No.: US 9,909,458 B2
(45) Date of Patent: Mar. 6, 2018

(54) INSTRUMENTATION BOSS FOR FAN CONTAINMENT CASE

(71) Applicant: UNITED TECHNOLOGIES CORPORATION, Farmington, CT (US)

(72) Inventors: Thomas J. Robertson, Jr., Glastonbury, CT (US); Mark W. Costa, Storrs, CT (US); Steven Clarkson, Cheshire, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 395 days.

(21) Appl. No.: 14/613,755

(22) Filed: Feb. 4, 2015

(65) Prior Publication Data
US 2016/0010503 A1    Jan. 14, 2016

Related U.S. Application Data

(60) Provisional application No. 62/001,955, filed on May 22, 2014.

(51) Int. Cl.
*F01B 25/26* (2006.01)
*F01D 25/28* (2006.01)
*F01D 25/24* (2006.01)
*G01D 11/30* (2006.01)

(52) U.S. Cl.
CPC .............. *F01D 25/28* (2013.01); *F01D 25/24* (2013.01); *G01D 11/30* (2013.01); *F05D 2230/60* (2013.01); *F05D 2240/90* (2013.01); *F05D 2300/121* (2013.01); *F05D 2300/603* (2013.01); *Y02T 50/672* (2013.01)

(58) Field of Classification Search
CPC ....... Y02T 50/672; F01D 25/28; F01D 25/24; F05D 2240/60; F05D 2230/60; F05D 2300/121; G01D 11/30
USPC .......................................................... 415/118
See application file for complete search history.

(56) References Cited

U.S. PATENT DOCUMENTS

| | | | | |
|---|---|---|---|---|
| 4,572,677 A | * | 2/1986 | Sehgal | G01K 1/14 136/230 |
| 8,454,232 B2 | * | 6/2013 | Stoll | F16B 33/02 374/142 |
| 8,740,558 B2 | * | 6/2014 | Robertson, Jr. | F01D 25/243 415/200 |
| 8,944,473 B2 | * | 2/2015 | Lutzke | F16L 37/098 285/305 |
| 2013/0336773 A1 | | 12/2013 | Robertson, Jr. | |

* cited by examiner

*Primary Examiner* — Umashankar Venkatesan
(74) *Attorney, Agent, or Firm* — Cantor Colburn LLP (57) ABSTRACT

A method for installing a mounting hole through a wall of a fan case of a gas turbine engine is disclosed. The method may comprise: 1) installing a pilot hole through the wall of the fan case at an angle perpendicular to an outer surface of the wall, 2) inserting a boss through the pilot hole, 3) bonding the boss to the wall of the fan case, and 4) installing the mounting hole through the boss at an off-axis angle with respect to the angle perpendicular to the outer surface of the wall.

10 Claims, 8 Drawing Sheets

INSTRUMENTATION BOSS FOR FAN CONTAINMENT CASE

CROSS REFERENCE TO RELATED APPLICATION

This application is a non-provisional claiming priority under 35 USC § 119(e) to U.S. Provisional Patent Application Ser. No. 62/001,955 filed on May 22, 2014.

FIELD OF THE DISCLOSURE

The present disclosure generally relates to gas turbine engines, and more specifically, relates to systems for mounting instrumentation on fan containment cases of gas turbine engines.

BACKGROUND

Gas turbine engines are internal combustion engines typically used to provide thrust to an aircraft or to provide power for land-based operations. A gas turbine engine may consist of a fan section surrounded by a fan containment case, a compressor section, one or more combustors, and a turbine section. Air may be drawn into the engine and accelerated by the rotating blades of the fan section, and it may be subsequently compressed/pressurized in the compressor section prior to entry into the combustor(s). Once in the combustor(s), the air may be mixed with fuel and combusted to generate hot combustion gases. Energy may then be extracted from the combustion gas products in the turbine section to power the turbine section, the compressor section, and the fan section. The combustion gas products may then be expelled through an exhaust nozzle of the engine to provide forward thrust for aerospace applications, or to provide power for other applications.

During the testing and development of new gas turbine engines, various types of instrumentation may be mounted on the fan containment case for testing engine operation. Some testing systems may require the use of arrays of instruments mounted on the fan case, with each of the instruments extending into the outer flowpath of the fan section. For example, in one testing system, a pair of probes may be mounted on the fan case forward and aft of a fan blade to monitor the position and rotation of the blade. Due to the curved shape of the fan blades, optimal readings in this system often requires the instruments to be inserted through the wall of the fan case at off-axis angles that deviate from perpendicular to the outer surface of the fan case. However, as many recent gas turbine engine designs use composite-based fan containment cases, the formation of off-axis cuts through the composite fan cases for mounting the instruments has presented a significant challenge as off-axis cuts may damage the composite materials of the fan case.

To enable the mounting of instrumentation features on composite fan cases, US Patent Application Publication Number 2013/0336773 describes the use metallic rails with instrument holders mounted on a band of sacrificial composite material circumscribing the outer surface of the fan case. The sacrificial composite material reinforces the fan case and allows the drilling of a hole through the composite fan case. While effective, it is not disclosed whether the metallic rails support the mounting of instruments at off-axis angles. Moreover, space may be limited for such metallic rails on fan cases due to instrumentation trays or other external components.

Clearly, there is a need for improved systems for mounting instruments on composite fan cases of gas turbine engines.

SUMMARY OF THE DISCLOSURE

In accordance with one aspect of the present disclosure, a method for installing a mounting hole through a wall of a fan case of a gas turbine engine is disclosed. The method may comprise: 1) installing a pilot hole through the wall of the fan case at an angle perpendicular to an outer surface of the wall, 2) inserting a boss through the pilot hole, 3) bonding the boss to the wall of the fan case, and 4) installing the mounting hole through the boss.

In another refinement, installing the mounting hole through the boss may include installing the mounting hole through the boss at an off-axis angle with respect to the angle perpendicular to the outer surface of the wall.

In another refinement, bonding the boss to the wall of the fan case may include adhesively bonding the boss to the wall of the fan case.

In another refinement, the boss may comprise a base and an insertion tab extending from a bottom surface of the base, and inserting the boss through the pilot hole may include inserting the insertion tab through the pilot hole.

In another refinement, bonding the boss to the wall of the fan case may further include fixing a width of an adhesive bond between the bottom surface and the outer surface of the wall using at least one bond bump extending from the bottom surface of the base.

In another refinement, bonding the boss to the wall of the fan case may further include fixing a width of an adhesive bond between the insertion tab and a wall of the pilot hole using at least one o-ring encircling the insertion tab.

In another refinement, inserting the boss through the pilot hole may further include centering the boss in the pilot hole using the at least one o-ring.

In another refinement, inserting the boss through the pilot hole may further include aligning a curvature of the bottom surface of the base with a curvature of the outer surface of the wall of the fan case by aligning an indicating feature of the boss with an indicating feature of the fan case.

In another refinement, the method may further comprise installing at least one fastener hole through the boss.

In another refinement, the method may further comprise inserting an instrument through the mounting hole, and fastening the instrument to the boss using at least one fastener.

In accordance with another aspect of the present disclosure, a fan case for a gas turbine engine is disclosed. The fan case may comprise a circumferentially-extending wall formed at least in part from a composite material. The wall may have at least one pilot hole extending therethrough at an angle perpendicular to an outer surface of the wall. The fan case may further comprise a boss bonded to the fan case. The boss may comprise: 1) a base, 2) an insertion tab extending from a bottom surface of the base and through the pilot hole, and 3) a mounting hole extending through the boss.

In another refinement, the mounting hole may extend through the boss at an off-axis angle with respect to the angle perpendicular to the outer surface of the wall.

In another refinement, the boss may be adhesively bonded to the wall of the fan case.

In another refinement, the boss may be formed from aluminum.

In another refinement, the insertion tab may comprise at least one o-ring encircling the insertion tab.

In another refinement, the at least one o-ring may center the boss in the pilot hole.

In another refinement, the bottom surface of the base may include at least one bond bump that may fix a width of an adhesive bond between the bottom surface of the base and the outer surface of the wall of the fan case.

In another refinement, the bottom surface of the base may further include a curvature matching a curvature of the outer surface of the wall.

In another refinement, the boss may further include at least one indicating feature to indicate an alignment of the curvature of the bottom surface of the base with the curvature of the outer surface of the wall.

In accordance with another aspect of the present disclosure, a boss for mounting an instrument on a composite fan case of a gas turbine engine is disclosed. The boss may comprise a base and an insertion tab extending from a bottom surface of the base. The insertion tab may be configured to insert through a pilot hole that extends through a wall of the composite fan case at an angle perpendicular to an outer surface of the wall. The boss may further comprise a mounting hole extending through the boss at an off-axis angle with respect to the angle perpendicular to the outer surface of the wall.

These and other aspects and features of the present disclosure will be more readily understood when read in conjunction with the accompanying drawings.

It should be understood that the drawings are not necessarily drawn to scale and that the disclosed embodiments are sometimes illustrated schematically and in partial views. It is to be further appreciated that the following detailed description is merely exemplary in nature and is not intended to limit the invention or the application and uses thereof. In this regard, it is to be additionally appreciated that the described embodiment is not limited to use for instrument mounting on fan containment cases of gas turbine engines. Hence, although the present disclosure is, for convenience of explanation, depicted and described as certain illustrative embodiments, it will be appreciated that it can be implemented in various other types of embodiments and in various other systems and environments.

DETAILED DESCRIPTION

Figure 1:
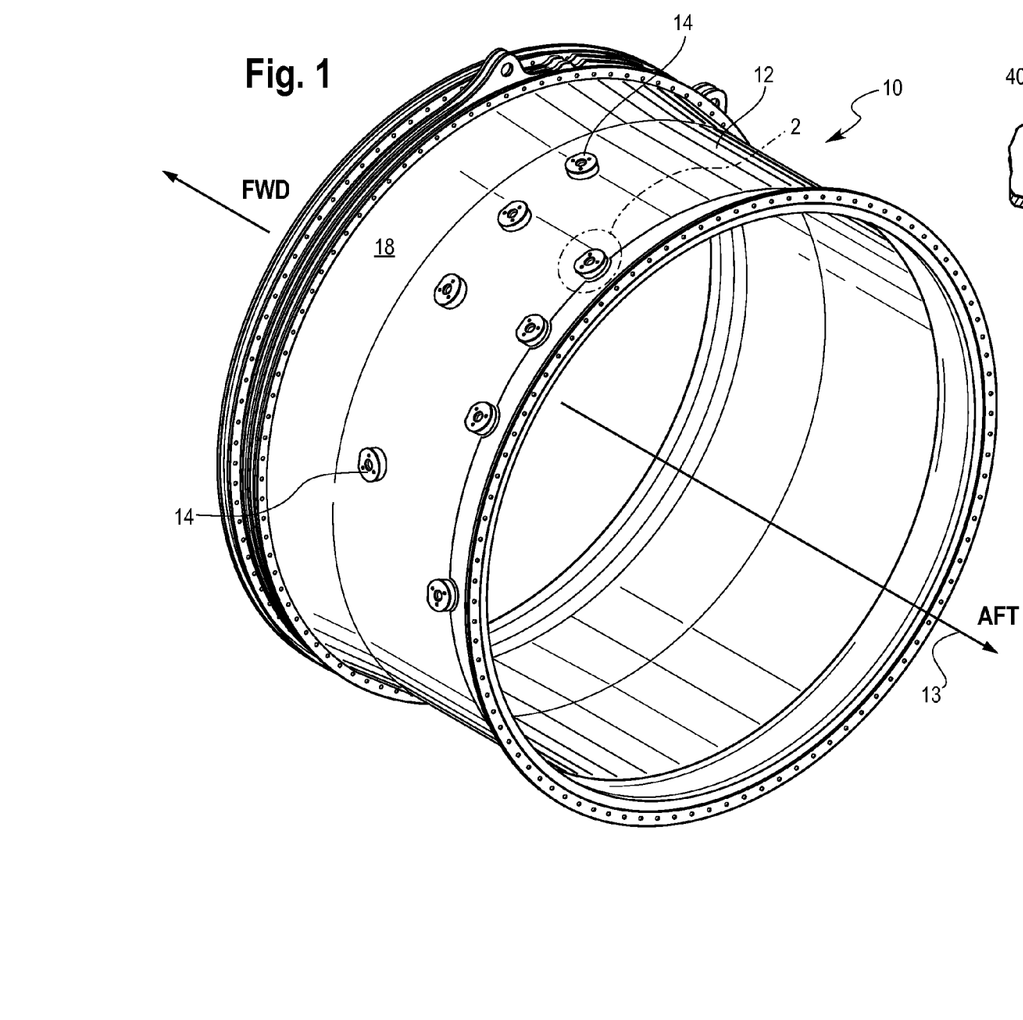
FIG. 1 is a perspective view of a fan case of a gas turbine engine, constructed in accordance with the present disclosure.

Referring now to the drawings, and with specific reference to FIG. 1, a fan case 10 for a gas turbine engine is depicted. The fan case 10 may form a containment case for a fan section of the gas turbine engine. It may have a wall 12 circumferentially extending about a central axis 13 and having one or more bosses 14 affixed thereto for mounting equipment on the fan containment case. As a non-limiting possibility, the bosses 14 may be configured to mount one or more testing instruments on the fan containment case 10, such as during the testing or development of the gas turbine engine. For example, for monitoring the position or rotation of the fan blades of the fan section, pairs of bosses 14 may be positioned co-axially with respect to each other on the fan case 10, with one boss 14 being positioned forward of the fan blade of interest and the other boss 14 being positioned aft of the fan blade of interest. However, various alternative arrangements of the bosses 14 may be used depending on the measuring requirements of the instruments. In addition, the bosses 14 may be used to mount other types of equipment on the fan case as well.

The wall 12 of the fan case 10 may be at least partially formed from a composite material such as a carbon epoxy composite or another type of type of composite material. The bosses 14 may be formed from a material that is more easily machined compared to the composite material of the fan case 10. For example, the bosses 14 may be formed from aluminum, an aluminum alloy, or another type of readily machinable metal or material. Due to their readily machinable construction, mounting holes 16 for instruments or other types of equipment may be drilled into the bosses 14 at various angles, including "off-axis angles" that deviate with respect an angle perpendicular to an outer surface 18 of the fan case (see FIGS. 2-3 and further details below). Accordingly, off-axis cuts may be formed through the bosses 14, rather than through the composite material of the fan case 10, to reduce or eliminate the risk of damage to the fan case 10.

Figure 2:
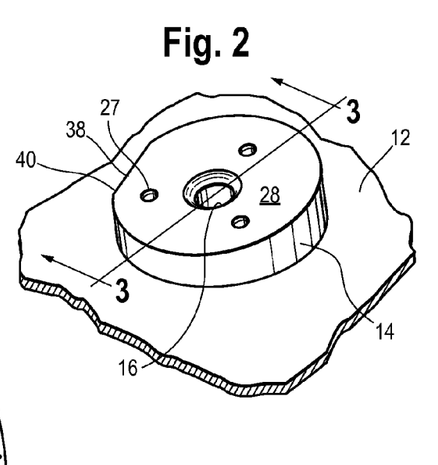
FIG. 2 is perspective view of detail 2 of FIG. 1, illustrating a boss attached to the fan case, constructed in accordance with the present disclosure.
Figure 3:
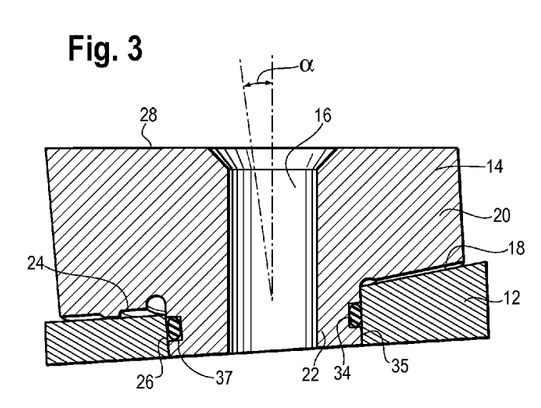
FIG. 3 is a cross-sectional view through the section 3-3 of FIG. 2, illustrating a mounting hole through the boss at an off-axis angle, constructed in accordance with the present disclosure.

Turning now to FIGS. 2-3, a single boss 14 attached to the fan case 10 is shown. The boss 14 may have a base 20 and an insertion tab 22 extending from a bottom surface 24 of the base 20, as best shown in FIG. 3. Although shown as cylindrical in shape, the base 20 and the insertion tab 22 may have various other shapes as well. The insertion tab 22 may extend through a pilot hole 26 formed in the wall 12 of the fan case 10, and the bottom surface 24 of the base 20 may face the outer surface 18 of the fan case 10. The boss 14 may be adhesively bonded to the fan case 10 with a suitable elastomeric or other bond-thickness tolerant adhesive such as, but not limited to, a polysulfide adhesive or a room temperature vulcanizing (RTV) adhesive. In particular, the bottom surface 24 may be adhesively bonded to the outer surface 18, and the insertion tab 22 may be adhesively bonded to the wall of the pilot hole 26.

The boss 14 may have one or more mounting holes 16 formed through the body of the boss and extending through the wall 12 of the fan case 10, as best shown in FIG. 3. The mounting hole 16 may be oriented at various angles ($\alpha$) with respect to an angle perpendicular to the outer surface 18 of the wall 12, and the angle ($\alpha$) may be dictated by the mounting or measuring requirements of the instrument/equipment. For example, the angle ($\alpha$) may range from about 0° to about 15°, although angles outside of this range may also be used in some circumstances. The boss 14 may also have one or more fastener holes 27 formed on an upper surface 28 of the base 20 for fastening the instrument/equipment to the boss 14 (see FIG. 2).

Figure 4:
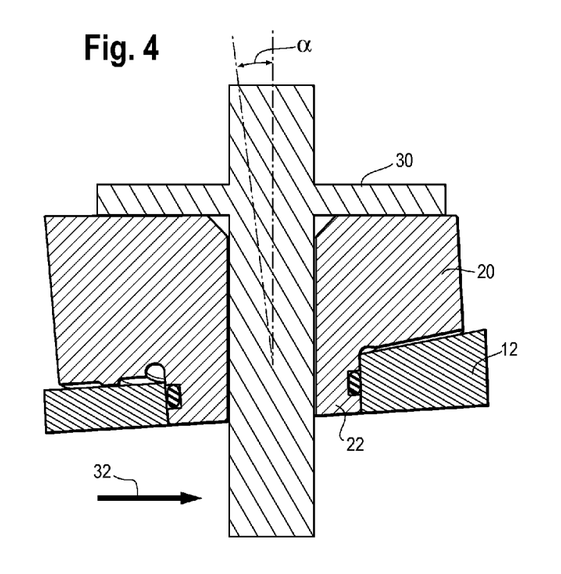
FIG. 4 is a cross-sectional view similar to FIG. 3, but having an instrument inserted in the mounting hole, constructed in accordance with the present disclosure.

Turning now to FIG. 4, an instrument 30 or other type of equipment may be inserted through the mounting hole 16 of the boss 14 to support the instrument 30 on the fan case 10 at a desired angle ($\alpha$). As one possibility, the instrument 30 may be involved in monitoring the position/rotation of fan blades of the gas turbine engine. In this case, the instrument 30 may extend through both the body of the boss 14 and the wall 12 of the fan case 10 to be placed in contact with an outer airflow path 32. In addition, the instrument 30 may also extend through any flowpath liners (not shown) that exist between the inner surface of the wall 12 and the outer airflow path 32. However, various other mounting arrangements may also apply depending on the type of instrument/equipment used.

Figure 5:
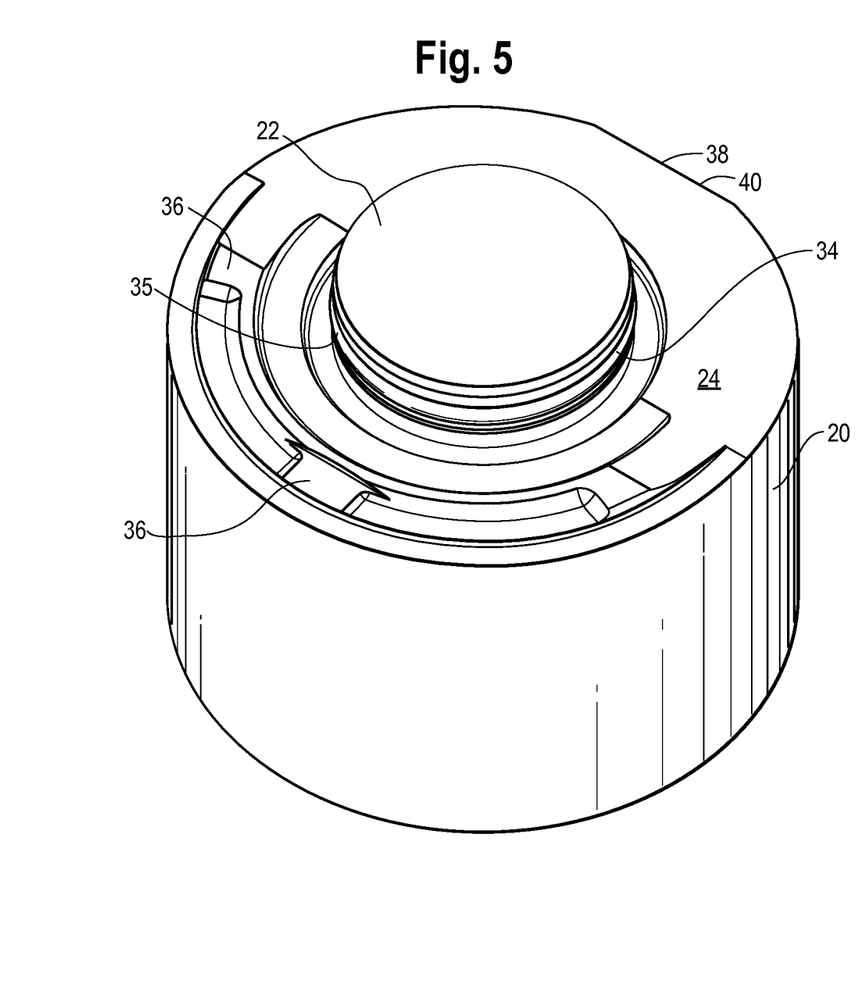
FIG. 5 is a bottom perspective view of the boss prior to installation in the fan case, constructed in accordance with the present disclosure.

Referring now to FIG. 5, additional features of the boss 14 will now be described. Prior to installation on the fan case 10, the boss 14 may be provided without a mounting hole and the insertion tab 22 may have a solid construction, such that the mounting hole(s) 16 may be machined/drilled through the boss 14 upon installation on the fan case 10 (see further details below). The insertion tab 22 may have one or more o-rings 34 encircling a periphery 35 of the insertion tab 22 that may serve to center the boss 14 in the pilot hole 26. The insertion tab 22 may also have one or more apertures 37 configured to retain the o-ring(s) 34 in position (see FIG. 3). The o-ring 34 may be formed from an electrically insulating material (e.g., silicone, etc.) that may provide galvanic isolation between the boss 14 and the composite material of the fan case 10, thereby assisting to prevent galvanic corrosion.

The o-ring 34 may also assist in fixing a width of the adhesive bond between the insertion tab 22 and the wall of the pilot hole 26 (also see FIG. 3). Similarly, one or more bond bumps 36 may extend from the bottom surface 24 of the base 20 to assist in fixing a width of an adhesive bond between the bottom surface 24 and the outer surface 18 of the fan case 10. The bond bumps 36 may consist of raised portions on the bottom surface 24 that extend in a radial direction from the insertion tab 22. The height of the bond bumps 36, as well as the thickness of the o-ring(s) 34, may be configured to provide an optimized adhesive bond gap spacing between the fan case 10 and the boss 14 according to the optimal bond gap spacings of the selected adhesive.

The bottom surface 24 and the bond bumps 36 may have a curvature that matches or at least closely compliments a curvature of the outer surface 18 of the fan case 10. The boss 14 may also have an indicating feature 38 which may be aligned with an indicating feature on the fan case 10 to ensure curvature alignment between the curvature of the bottom surface 24/bond bumps 36 and the curvature of the outer surface 18 (also see FIG. 2). As one possibility, the indicating feature 38 may consist of a flattened tab 40 which may be aligned with a horizontal line 42 of the fan case 10 when the fan case is disengaged from the gas turbine engine and oriented vertically (see FIG. 6 and further details below).

Figure 6:
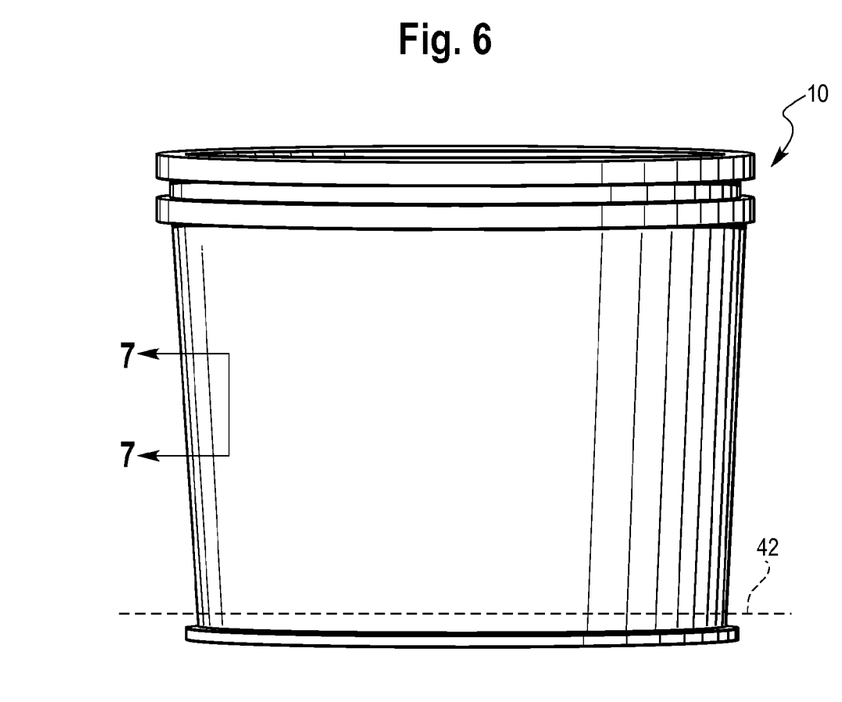
FIG. 6 is a side view of the fan case in a vertical position to prior to installation of the boss, constructed in accordance with the present disclosure.
Figure 7:
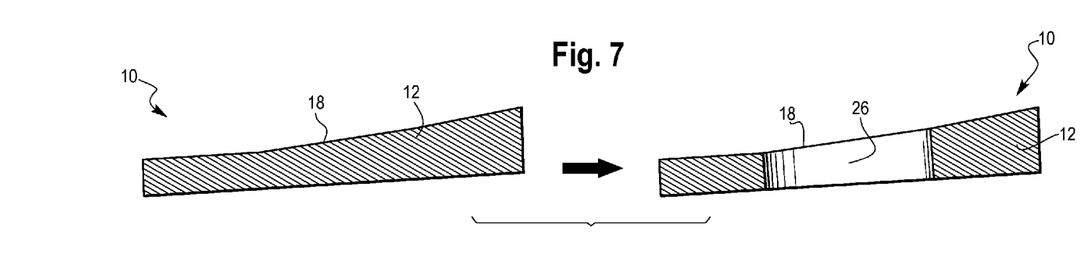
FIG. 7 is a cross-sectional view through the section 7-7 of FIG. 6, schematically illustrating the formation of a pilot hole in the fan case, in accordance with a method of the present disclosure.

The boss 14 may be installed on the fan case 10 while the fan case is disconnected from the rest of the gas turbine engine and mounted vertically as shown in FIG. 6, such as at a tilting/rotating machining station (not shown). FIGS. 7-10 schematically depict a series of steps that may be involved in installing the boss 14 on the fan case 10. As shown in FIG. 7, the pilot hole 26 may first be drilled, machined, or otherwise formed through the wall 12 of the fan case 10 at the desired mounting location. The pilot hole 26 may have a diameter matching a diameter of the insertion tab 22, and it may be installed at an angle perpendicular to the outer surface 18 of the fan case 10 so as to avoid off-axis cuts that could damage the composite material of the fan case 10.

Figure 8:
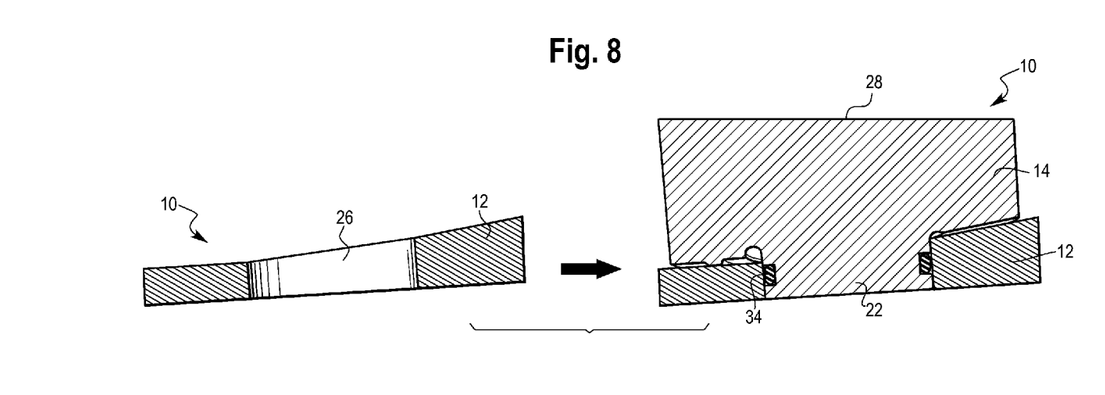
FIG. 8 is a cross-sectional view similar FIG. 7, but schematically illustrating the installation of the boss in the pilot hole, in accordance with a method of the present disclosure.

After applying a selected adhesive along the bottom surface 24 of the base 20 and around the periphery 35 of the insertion tab 22, the boss 14 may be inserted through the pilot hole 26 as shown in FIG. 8. More specifically, with the indicating feature 38 properly aligned with an indicating feature on the fan case 10 (e.g., the horizontal line 42), the insertion tab 22 may be inserted through the pilot hole 26 until the bond bump(s) 36 abut against the outer surface 18 of the fan case 10. This may cause excess adhesive to flow out of the bonding interface, thereby fixing the width of the adhesive bond between the bottom surface 24 and the outer surface 18 of the fan case 10. In addition, the o-ring(s) 34 may center the boss 14 in the pilot hole 26, while fixing the width of the adhesive bond between the insertion tab 22 and the wall of the pilot hole 26. The adhesive may then be allowed to cure to affix the boss 14 to the fan case 10. If necessary, the upper surface 28 of the boss 14 may also be machined at an angle that is perpendicular to the desired angle ($\alpha$) of the mounting hole 16.

Figure 9:
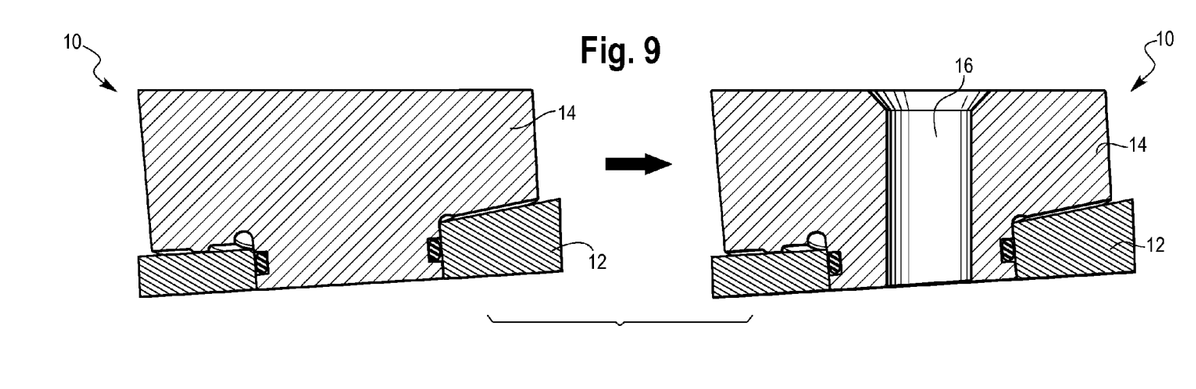
FIG. 9 is a cross-sectional view similar to FIG. 8, but schematically illustrating the installation of the mounting hole through the boss, in accordance with a method of the present disclosure.
Figure 10:
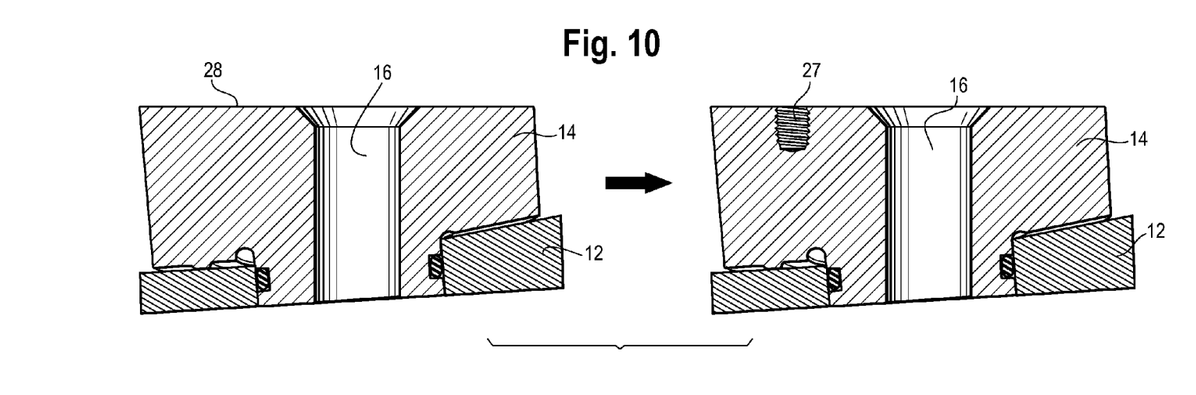
FIG. 10 is a cross-sectional view similar to FIG. 9, but schematically illustrating the installation of a fastener hole in the boss, in accordance with a method of the present disclosure.

The mounting hole 16 may be drilled, machined, or otherwise formed through the boss 14 at the desired angle ($\alpha$), as depicted in FIG. 9. In addition, as shown in FIG. 10, one or more fastener holes 27 may be drilled or machined through the upper surface 28 of the boss 14 to allow the fastening of the instrument 30 to the boss 14. The fastener holes 27 may be threaded holes or other types of fastener holes. In some cases, the steps depicted in FIGS. 7-10 may be repeated as necessary to provide an array of bosses 14 attached to the fan case 10 at desired positions.

Figure 11:
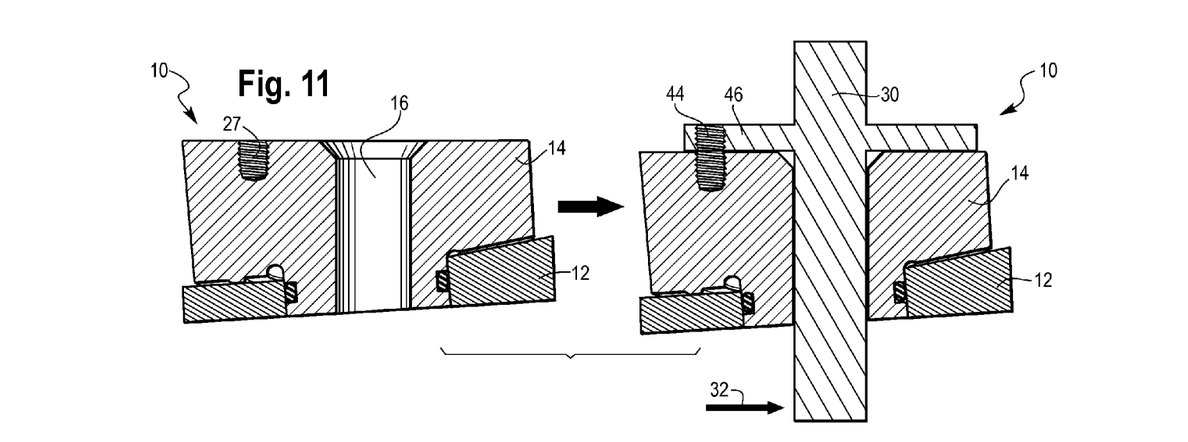
FIG. 11 is a cross-sectional view similar to FIG. 10, but schematically illustrating the insertion of the instrument in the mounting hole, in accordance with a method of the present disclosure.
Figure 12:
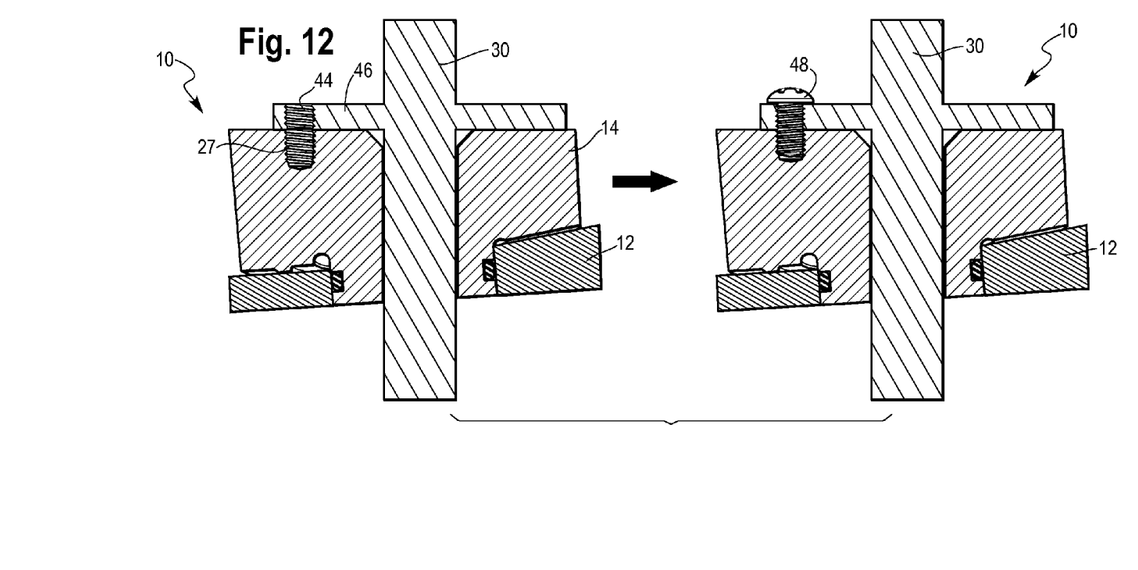
FIG. 12 is a cross-sectional view similar to FIG. 11, but schematically illustrating the fastening of the instrument to the boss, in accordance with a method of the present disclosure.

Once the desired number of bosses 14 is affixed to the fan case 10, the fan case 10 may be delivered to and assembled with the gas turbine engine. The instrument 30 may then be mounted on the fan case 10 according to the steps depicted in FIGS. 11-12. The instrument 30 may be inserted through the mounting hole 16 and through any flowpath liners to place at least a portion of the instrument 30 in contact with the outer airflow path 32, as depicted in FIG. 11. In addition, one or more fastener holes 44 formed in a flange 46 of the instrument 30 may be aligned with the fastener hole(s) 27 of the boss 14, as shown. The instrument 30 may then be fastened to the boss 14 using one or more fasteners 48 (see FIG. 12). The fastener(s) 48 may be threaded fasteners, although other types of fasteners or fastening arrangements may also be used in some circumstances. Once mounted and fastened to the boss 14, the instrument 30 may perform measurements while the gas turbine engine is running at a testing station or on an aircraft. When the measurements are completed, the instrument 30 may be removed from the boss 14 and a plug may be inserted and affixed to the mounting hole 16 to permit the use of the gas turbine engine in various aerospace or land-based applications.

Figure 13:
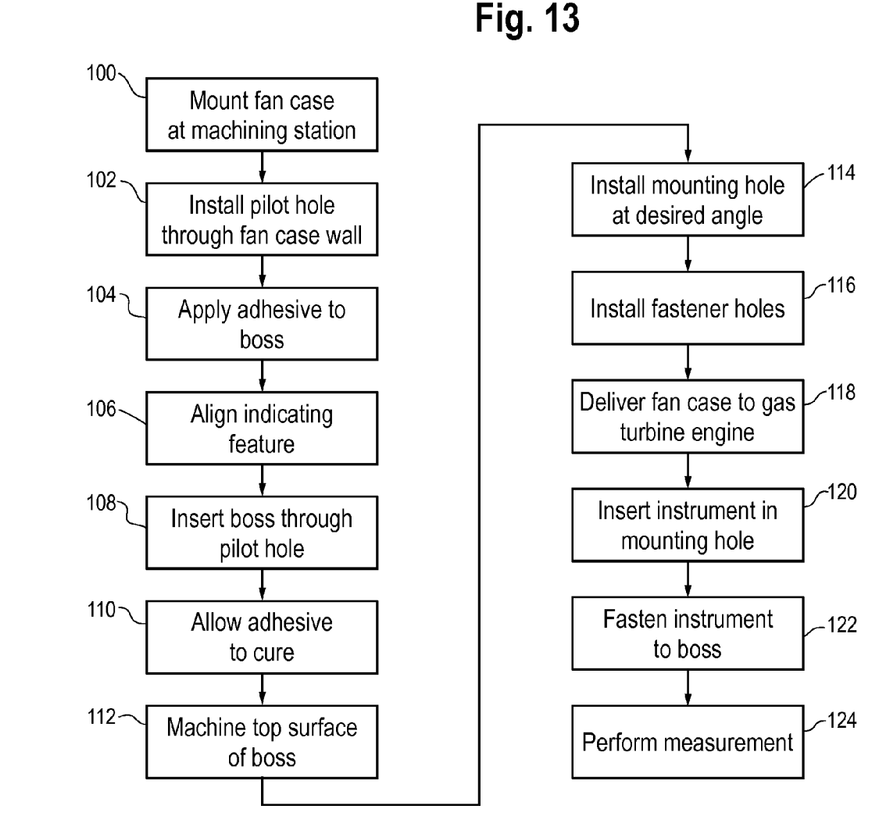
FIG. 13 is a flowchart illustrating a sample sequence of steps which may be involved in mounting the instrument to the fan case using the boss, in accordance with a method of the present disclosure.

FIG. 13 summarizes the steps that may be involved in installing the boss 14 and the instrument 30 on the fan case 10. Beginning with a first block 100, the fan case 10 may be mounted vertically at a machining station (see FIG. 6). Next, a pilot hole 26 may be installed through the wall 12 of the fan case 10 at an angle perpendicular to the outer surface 18 of the fan case according to a next block 102 (see FIG. 7). A suitable adhesive may then be applied to the bottom surface 24 of the boss 14 and to the periphery 35 of the insertion tab 22 according to a block 104. According to the next blocks 106 and 108, the boss 14 may be inserted through the pilot hole 26 with the indicating feature aligned with an indicating feature on the fan case 10 (such as the horizontal line 42). Once the adhesive bond width is fixed by abutting the bond bumps 36 against the outer surface 18 of the fan case 10, the adhesive may be allowed to cure according to a next block 110. In addition, the upper surface 28 of the boss 14 may be machined at an angle perpendicular to the desired mounting hole angle ($\alpha$) (block 112).

The mounting hole 16 may be installed through the boss at the desired angle ($\alpha$) according to the measuring requirements of the instrument 30 (block 114/FIG. 9), and one or more fastener holes may be drilled/machined through the upper surface 28 of the boss 14 (block 116/FIG. 10). At this stage, the fan case 10 may be delivered to and assembled with the gas turbine engine to perform the desired measurements (block 118). The instrument 30 may then be inserted through the mounting hole 16 and fastened to the boss 14 according to blocks 120 and 122 (FIGS. 11-12), and the desired measurements may be performed (block 124). It will be understood that the steps disclosed above may be repeated as necessary to carry out all required measurements. In addition, it will also be understood that variations in the sequence of steps depicted in FIG. 13 may be necessitated under various circumstances. Variations such as these are also encompassed within the scope of the present disclosure.

INDUSTRIAL APPLICABILITY

In general, it can therefore be seen that the technology disclosed herein has industrial applicability in a variety of settings including, but not limited to, the development and testing of gas turbine engines. The boss disclosed herein allows the mounting of instruments or other equipment through the walls of composite fan cases at off-axis angles for various testing purposes, without requiring the drilling of off-axis cuts through the composite material of the fan case. In this way, the technology of the present disclosure may reduce or eliminate the risk of damage to composite fan cases caused by the drilling or machining of off-axis cuts through the fan case wall. The boss may be constructed from readily available materials which may be readily machined to install mounting holes at various angles. In addition, the bosses disclosed herein may replace instrumentation rails of the prior art when space limitations on the fan case precludes their use. Other advantageous features of the boss include an o-ring for centering the boss in the pilot hole, bond bumps for fixing the adhesive bond width between the boss and the fan case, and an indicating feature for assisting the alignment of the curvature of the boss with the curvature of the outer surface of the fan case. It is expected that the technology disclosed herein may find wide industrial applicability in a wide range of areas such as, but not limited to, aerospace technologies.

What is claimed is:

1. A fan case for a gas turbine engine, comprising:
  a circumferentially-extending wall formed at least in part from a composite material and having a pilot hole extending therethrough at an angle perpendicular to an outer surface of the wall; and
  a boss bonded to the fan case comprising
    a base,
    an insertion tab extending from a bottom surface of the base and through the pilot hole, and
    a mounting hole extending through the boss.

2. The fan case of claim 1, wherein the mounting hole extends through the boss at an off-axis angle with respect to the angle perpendicular to the outer surface of the wall.

3. The fan case of claim 2, wherein the boss is adhesively bonded to the wall of the fan case.

4. The fan case of claim 3, wherein the boss is formed from aluminum.

5. The fan case of claim 3, wherein the insertion tab includes at least one o-ring encircling a periphery of the insertion tab.

6. The fan case of claim 5, wherein the at least one o-ring centers the boss in the pilot hole.

7. The fan case of claim 6, wherein the bottom surface of the base includes at least one bond bump extending radially from the insertion tab, and wherein the at least one bond bump fixes a width of an adhesive bond between the bottom surface of the base and the outer surface of the wall of the fan case.

8. The fan case of claim 1, wherein the bottom surface of the base further includes a curvature matching a curvature of the outer surface of the wall.

9. The fan case of claim 8, wherein the boss further comprises at least one indicating feature to indicate an alignment of the curvature of the bottom surface of the base with the curvature of the outer surface of the wall.

10. A boss for mounting an instrument on a composite fan case of a gas turbine engine, comprising:
  a base, the base including a bottom surface configured to abut an outer surface of the fan case and having a base curvature matching an outer surface curvature of the outer surface;
  an insertion tab extending from the bottom surface of the base, the insertion tab being configured to insert through a pilot hole that extends through a wall of the composite fan case at an angle perpendicular to the outer surface of the fan case; and
  a mounting hole extending through the boss at an off-axis angle with respect to the angle perpendicular to the outer surface of the fan case.

* * * * *